US012124239B2

(12) United States Patent
Dörfler et al.

(10) Patent No.: US 12,124,239 B2
(45) Date of Patent: Oct. 22, 2024

(54) CIRCUIT ARRANGEMENT FOR CONTROLLING SEAT COMFORT SYSTEMS, SEAT, AND METHOD FOR CONTROLLING A SEAT COMFORT SYSTEM

(71) Applicant: Alfmeier Präzision SE, Treuchtlingen (DE)

(72) Inventors: Erich Dörfler, Landsberg (DE); Helmut Auernhammer, Höttingen (DE); Matthias Mitzler, Graben (DE); Maximilian Link, Bissingen (DE); Manfred Lehner, Schwarzenbruck (DE)

(73) Assignee: Alfmeier Präzision SE, Treuchtlingen (DE)

( * ) Notice: Subject to any disclaimer, the term of this patent is extended or adjusted under 35 U.S.C. 154(b) by 594 days.

(21) Appl. No.: 17/329,338

(22) Filed: May 25, 2021

(65) Prior Publication Data

US 2021/0373532 A1     Dec. 2, 2021

(30) Foreign Application Priority Data

May 29, 2020    (DE) .................... 10 2020 114 529.2

(51) Int. Cl.
*G05B 19/41*     (2006.01)
*B60N 2/02*     (2006.01)
(Continued)

(52) U.S. Cl.
CPC ....... *G05B 19/4155* (2013.01); *B60N 2/0224* (2013.01); *B60N 2/0244* (2013.01);
(Continued)

(58) Field of Classification Search
CPC ...... G05B 19/4155; G05B 2219/45022; B60N 2/0224; B60N 2/0244; B60N 2/665;
(Continued)

(56) References Cited

U.S. PATENT DOCUMENTS 5,660,207 A    8/1997  Mudd
5,763,979 A    6/1998  Mukherjee et al.
(Continued)

FOREIGN PATENT DOCUMENTS

CN    1175310 A       3/1998
CN    109017482       12/2018
(Continued)

OTHER PUBLICATIONS

German Patent and Trademark Office, Office Action dated Apr. 9, 2021 with English translation.
(Continued)

*Primary Examiner* — Rodney A Butler
(74) *Attorney, Agent, or Firm* — JK Intellectual Property Law, PA (57) ABSTRACT

A circuit arrangement for controlling a system for a seat comfort function includes at least one actuator with at least one adjusting element and at least one SMA element, wherein the adjusting element can be moved from a first position to a second position. At least one resistance measuring device measures a resistance of the at least one SMA element. At least one driver unit activates the actuator with the at least one SMA element. A control unit controls the driver unit, the driver unit being configured for processing an output signal of the resistance measuring device. The circuit arrangement is configured so that the resistance measuring device and the driver unit are alternatingly operationally connected to the SMA element. Related methods of operation and seats are disclosed.

13 Claims, 5 Drawing Sheets

(51) Int. Cl.
    *B60R 16/03*     (2006.01)
    *B60R 16/037*     (2006.01)
    *G01D 5/16*     (2006.01)
    *G05B 19/4155*     (2006.01)
    *B60N 2/66*     (2006.01)
    *B60N 2/90*     (2018.01)

(52) U.S. Cl.
    CPC ............. *B60R 16/037* (2013.01); *G01D 5/16* (2013.01); *B60N 2/665* (2015.04); *B60N 2/976* (2018.02); *G05B 2219/45022* (2013.01)

(58) Field of Classification Search
    CPC .......... B60N 2/976; B60N 2/66; B60N 2/914; B60N 2002/924; B60N 2/23; B60N 2/90; B60N 2/929; B60R 16/037; B60R 16/02; G01D 5/16; F16K 31/002; F16K 31/025; H02N 2/06
    See application file for complete search history.

(56) References Cited

U.S. PATENT DOCUMENTS

| | | |
|---|---|---|
| 5,765,283 A | 6/1998 | Mudd |
| 5,850,850 A | 12/1998 | Mudd |
| 5,901,741 A | 5/1999 | Mudd |
| 8,339,073 B2 | 12/2012 | Honda |
| 10,948,098 B2 | 3/2021 | Pfahler |
| 2018/0355991 A1* | 12/2018 | Pfahler .................. B60N 2/914 |
| 2020/0223325 A1* | 7/2020 | Pinkelman ............. B60N 2/643 |

FOREIGN PATENT DOCUMENTS

| | | |
|---|---|---|
| DE | 10 2016 225 519 A1 | 6/2018 |
| EP | 1125077 B1 | 12/2004 |
| JP | 2009127578 A | 6/2009 |

OTHER PUBLICATIONS

Chinese Office Action for CN Application No. 202110599581.5, dated Nov. 8, 2023, with English translation.

\* cited by examiner

PRIOR ART

CIRCUIT ARRANGEMENT FOR CONTROLLING SEAT COMFORT SYSTEMS, SEAT, AND METHOD FOR CONTROLLING A SEAT COMFORT SYSTEM

CROSS-REFERENCE TO RELATED APPLICATION

This application claims benefit to German Patent Application Number 10 2020 114 529.2, dated May 29, 2020, which is incorporated in its entirety by reference herein.

TECHNICAL FIELD

The present disclosure relates to a circuit arrangement for controlling seat comfort systems, a seat, and a method for controlling a seat comfort system.

BACKGROUND

According to the state of the art, a circuit arrangement to control a system, especially a lumbar support with at least two air cushions, is known from DE 10 2017 112 803 A1, for example. Thus, the known circuit is suitable for a seat comfort system.

Figure 1A:
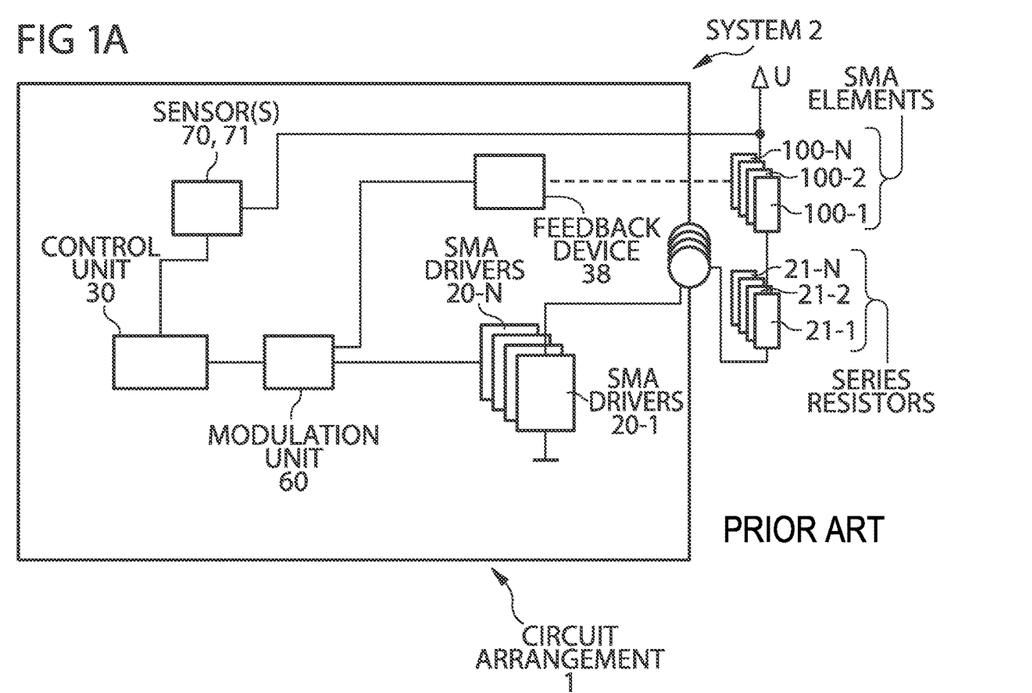
FIG. 1a is a schematic view of a conventional circuit arrangement.
Figure 1B:
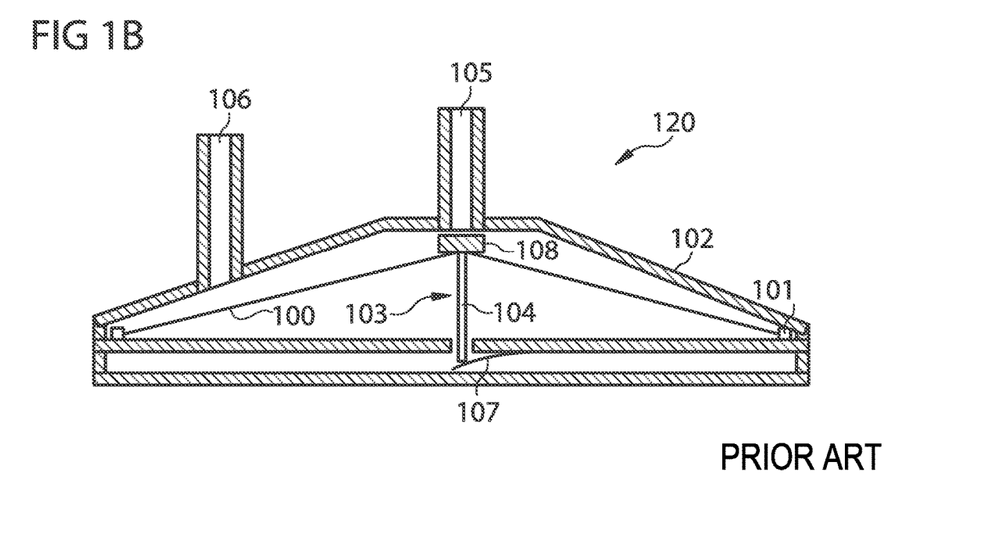
FIG. 1b is schematic sectional view of a conventional SMA valve with an actuator.
Figure 1C:
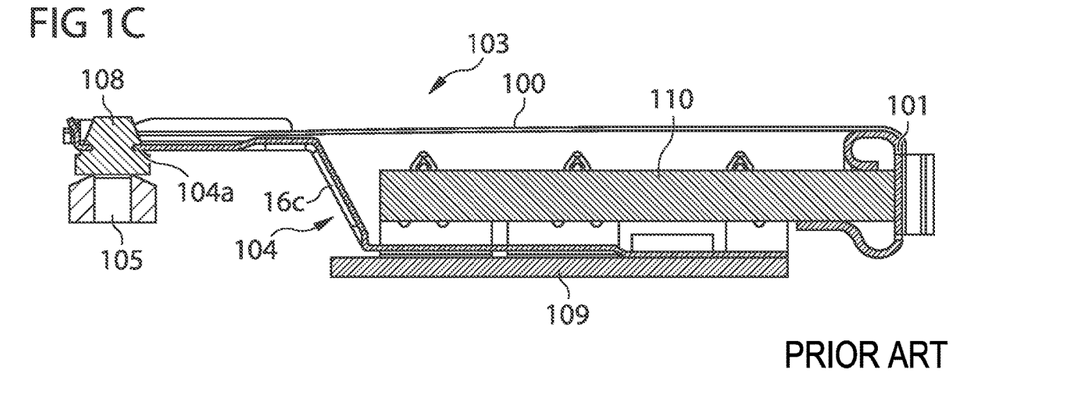
FIG. 1c is a schematic sectional view of an alternative arrangement of a conventional actuator.

FIGS. 1a-1c show a circuit arrangement to control a seat comfort system according to the state of the art. A seat comfort system, with a pneumatic lumbar support device and/or massage device for a seat, for example, typically comprises a plurality of air cushions 130 (not shown), to which the desired or time-dependent pressure, where appropriate, can be applied when they are filled. To achieve this, the seat comfort system comprises a control, a pump 140 (not shown) to apply pressure to the air cushions, and a plurality of valves 120, wherein expediently at least one valve is assigned to each air cushion. According to the state of the art, each one of these valves can include an actuator with an SMA element (shape memory alloy element) that, depending on the energization of the valve, moves it to an open, partially opened or closed functional state. Usually, the supplied power must be maintained within a very closely defined range in order to ensure a reliable activation of the actuator while nonetheless preventing a thermal overload and thus a permanent damage of the SMA element. Therefore, a control device must expediently have sensors for monitoring the current, voltage and/or temperature.

FIG. 1a shows a known circuit arrangement 1. The circuit arrangement 1 is suitable for controlling a system 2, especially a lumbar support with at least two air cushions 130 (not shown). Such a system comprises at least two air cushions that include at least one valve, especially at least one valve each. As shown exemplarily in FIG. 1b, such a valve 120 comprises one housing 102 and one actuator 103. The housing 102 includes one first opening 105 and a second opening 106. The actuator 103 includes one SMA element 100, which is executed as a V-shaped arranged wire, and an adjusting element 104 that can be moved with the SMA element 100, which is equipped with a sealing element 108 in order to either open or close the first opening 105. In an initial position of the adjusting element 104, the first opening 105 is opened and in a second position of the adjusting element 104, it is closed. From WO 2005/026592 A2, it is known that such a valve can have an end switch 107 that is closed when the second position is reached. This end switch makes it possible to partially or fully reduce the heat output supplied to the wire. A circuit with a temperature sensor that adjusts the heat output to the surrounding temperature is also known from WO 2005/026592 A2.

Alternatively to the actuator with a V-shaped SMA element shown in FIG. 1b, an actuator 103 with a linear or U-shaped SMA element 100 is known in which the adjusting element 104 can be formed from a leaf spring, for example, on whose first end the SMA element 100 engages. Here, the sealing element 108 can be held to the first end of the adjusting element in a through-hole 104a of the adjusting element 104. In the example shown, the adjusting element 104 is arranged between a base plate 109 and a circuit board 110 or board with its other end, wherein the SMA element 100 can be held and contacted by means of a crimp 101.

The circuit arrangement shown in FIG. 1a is suitable for energizing and switching several SMA elements 100-1 to 100-N. The SMA elements are connected to a voltage source U shown with the arrow. To do this, the circuit arrangement 1 has a control unit 30. In addition, a temperature sensor 70 can be present to measure the temperature of the SMA elements 100 and/or a voltage sensor 71. The control unit 30 is connected to a pulse width modulation unit 60. By means of the pulse width modulation unit 60, it is possible to control the SMA elements 100 via pulse width modulation, wherein the duty cycle of the pulse width modulation, i.e. the ratio of pulse to period duration, is set depending on the measured supply voltage and temperature. A circuit for a pulse width modulation is known, for example, from DE 10 2017 112 803 A1. By means of the respective driver 20-1 to 20-N, it is possible to consecutively energize the assigned SMA element 100-1 to 100-N. Series resistors 21-1 to 21-N can be present to prevent peak currents. Furthermore, the circuit arrangement can also comprise an end switch or a feedback device 38. The feedback device is connected either to the pulse width modulation unit 60 as shown or alternatively to the control unit 30, and is suitable for signaling that a final position of the actuator has been reached, something that is especially mechanically detected, to the pulse width modulation unit 60 or the control unit 30.

From DE 10 2016 225 519 A1A, a pneumatic valve having an actuator and movable shut-off elements is known, wherein the actuator is activated by means of an SMA element that can be deformed by electrical heat output. To activate the actuator, an electrical heat output is supplied to the SMA element, whereupon the SMA element deforms in a known way and a specified movement of the shut-off element for opening or closing an air connection is brought about as a result of that. The deformation of the SMA element is reversed when the supply of the electrical heat output is terminated, which causes the specified movement of the SMA element to be reversed. The known actuator also includes a detection unit to detect the reaching and leaving of a final position. In the embodiment shown, the final position is achieved by bridging a section of the SMA element and measuring a resistance reduced by the bridging.

The known processes are based on the activation of a kind of switch in a certain position of the adjusting element that is accomplished by a toggle switch or bridging. The functioning of such mechanical switches can be impaired not only by dirt particles, abrasion and fluids, but also by a high switching frequency.

SUMMARY

The task of the present disclosure is to specify a circuit arrangement for seat comfort systems and a seat equipped with seat comfort systems that improves on the disadvantages according to the state of the art. In particular, a circuit arrangement that allows a contact-free detection of a switching position of an SMA valve should be specified.

With regard to the circuit arrangement, the method, and the seat, such tasks may be completed with certain features of the present disclosure The circuit arrangement according to the present disclosure is designed to control a system for a seat comfort function. The system comprises at least one actuator with at least one adjusting element and at least one SMA element, wherein the adjusting element can be moved between a first position and a second position. Within the meaning of this patent application, the first position and second position are two positions separate from one another that can be selected as opening and closing position or intermediate positions. In the arrangement, the system consists of one or several valves that are used in a car seat as lumbar support device or massage device, for example, or comprises one or several such valves. Such an SMA element (shape memory alloy element) is especially a wire or strip from an SMA.

The circuit arrangement comprises at least one resistance measuring device to measure the resistance of the SMA element. Within the meaning of this present disclosure, resistance should be understood as the electrical resistance. Furthermore, the circuit arrangement has at least one driver unit to activate the actuator with the SMA element and a control unit to control the driver unit. A driver unit includes at least one SMA driver. The resistance measuring device makes it possible to measure a resistance and generate an output signal. The output signal is forwarded to the control unit, so that the control unit can regulate the driver unit based on the measured resistance value. The circuit arrangement has been designed in a way that either the resistance of the SMA element is measured or an energization takes place, so that the resistance measurement device and the driver unit can be alternatively operationally connected. To achieve this, the control unit can especially control the resistance measuring device as well.

In an arrangement, the control unit can be equipped with sensors for monitoring the current, voltage and/or temperature. Arranged, the control unit has communication interfaces so a switch and/or an on-board computer present in a vehicle can be controlled. As an additional input, the control unit can have a LIN (local interconnect network) communication interface that has especially a transceiver and/or a switch input interface. The switch input interface is especially suitable for processing resistance-based switching signals, wherein the switch input interface can be designed for a plurality of switch inputs, e.g. seat adjustment, especially position and lordosis, and massage. The control unit can include a memory for data storage.

The circuit arrangement comprises expediently an evaluation unit or is connected to it. The evaluation unit is switched between resistance measuring device and control unit so that the resistance measured value is measured, evaluated with the evaluation unit, and an output signal of the evaluation unit is transmitted to the control unit. This output signal can especially include a signal to transmit that a final condition has been reached.

In the arrangement, the circuit arrangement comprises a plurality of actuators, wherein a driver unit with an SMA driver is assigned to each actuator to activate the respective actuator or an SMA driver in a driver unit is assigned to each actuator. Expediently, the resistance measuring device comprises a multiplexer connected in such a way to each one of the SMA elements that the resistance of each SMA element can be individually measured. Thus, by means of the multiplexer, each SMA element can be successively connected to the resistance measuring device for measuring the resistance.

In another arrangement, the evaluation unit includes a memory for data storage, wherein the evaluation unit evaluates a history of consecutively measured resistance values and/or compares it with one or several specified resistance values. Alternatively, the memory can also be a common memory of the evaluation unit and the control unit.

The control unit is expediently to control by means of pulse width modulation. To do this, the control unit expediently includes a pulse width modulation unit. Hence, the SMA elements are successively energized within a duty cycle via the assigned SMA drivers of the driver unit for a given pulse width and pulse height and thus heated. In the arrangement, the pulse width modulation unit can emit a time signal to the resistance measuring device.

The evaluation unit comprises a signal amplifier and/or a noise suppressor.

The resistance measuring device comprises in an arrangement two or more multiplexers, attached in each case to a part of the SMA elements. This arrangement is possible for large systems having a plurality of SMA elements. For example, 20 SMA elements can be provided for each multiplexer.

Expediently, a series resistor is in each case switched in series between the resistance measuring device and the SMA element. This series resistor serves mainly to reduce power peaks, thus lowering the danger of an overload of the SMA elements.

In the arrangement, the circuit arrangement comprises an application-specific integrated circuit (ASIC) having one or several of the following components: driver, resistance measuring device, evaluation unit, memory, or control unit. Through the arrangement with an ASIC, the circuit becomes smaller and can be manufactured more economically.

The method according to the present disclosure to control a circuit arrangement, especially a circuit arrangement according to the present disclosure, includes:
Measuring a resistance of an SMA element,
Afterwards, energizing the SMA element by means of a driver depending on the measured resistance value or a change in the resistance value,
Cyclic repetition of the measuring and energizing until a final condition is reached.

The final condition is or includes one from reaching a specified resistance value, a specified change or a turning point of a resistance value curve. When an SMA element is heated, especially if a heating current is allowed to flow through the SMA element, its resistance changes. Such a change in the resistance was published, for example, by Song at NDT in Canada in 2011: "Resistance modelling of SMA wire actuators" in the International Workshop Smart Materials Structures & NDT in Aerospace. Thus, a specified change in the length, especially a shortening, can be assigned to a resistance change. However, the resistance change is not linear, but includes linear and almost linear sections. Tests have revealed that an increase of the resistance curve when an endpoint of the actuator is reached has a sign reversal, so that the resistance curve has a turning point, i.e. a zero crossing of the second derivative of the resistance curve. The turning point can be determined by the comparison with the resistance value or previously measured resistance values. A combination of detection of the turning point and comparison with a specified absolute value increases the accuracy of the method. The final condition can be selected especially for a normal operation in such a way that the adjusting element is brought to an intermediate position near the opening or closing position so that an endpoint of the actuator is not reached with the method according to the present disclosure. This reduces the mechanical stress of the valves.

Expediently, the method includes a control by means of pulse width modulation.

In the arrangement, the resistance of all elements is measured in a common activation dead time. Alternatively, an element can be measured in each case between the activation of the SMA element and the activation of the subsequent element. The activation dead time can take place after each activation cycle or after a group of activation cycles.

The seat comfort system according to the present disclosure comprises the circuit arrangement according to the present disclosure, at least one, especially two air cushions—each one with one valve, wherein the valve has at least one actuator having at least one adjusting element and at least one SMA element, wherein the adjusting element can be moved between a first position and a second position.

In the arrangement, the adjusting element is or can furthermore be connected to a switch that detects when the first or second position has been reached. This switch can especially serve to calibrate the method according to the present disclosure, e.g. the storing of an absolute resistance value as turn-off condition.

The seat according to the present disclosure comprises a seat comfort system with the circuit arrangement.

BRIEF DESCRIPTION OF THE DRAWINGS

The present disclosure will now be explained in more detail, also with regard to additional features and advantages, by describing the embodiments and with reference to the enclosed drawings.

DETAILED DESCRIPTION

Figure 2:
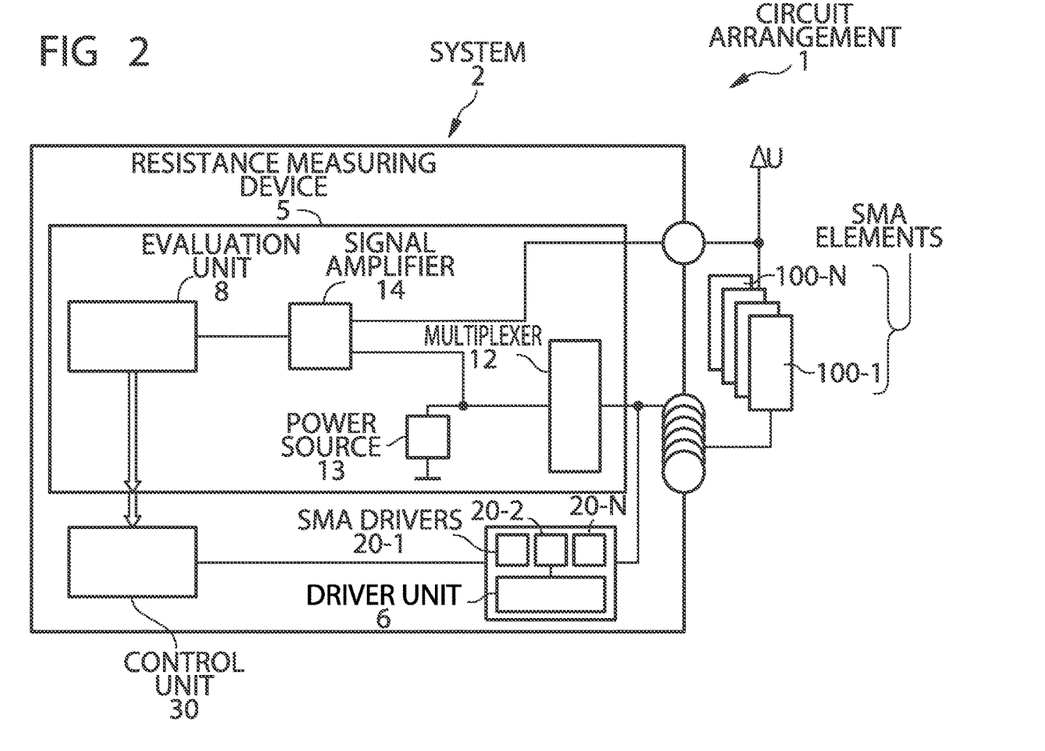
FIG. 2 is a schematic view of a first embodiment of a circuit arrangement according to the disclosure.

FIG. 2 shows a first embodiment of a circuit arrangement 1. The circuit arrangement 1 is designed for a seat comfort system with the SMA elements 100, which—as shown in FIGS. 1b and 1c—are especially a part of an actuator and thus of a valve.

The circuit arrangement comprises a resistance measuring device 5 and a control unit 30. The resistance measuring device 5 can be connected to each one of the SMA elements 100-1 to 100-N. The SMA elements are connected to a voltage source U indicated by the arrow. The control unit 30 can be or is permanently connected with the SMA drivers 20 to each one of the SMA elements 100-1 to 100-N. The SMA drivers 20 are arranged in a driver unit 6. The resistance measuring device 5 generates an output signal transmitted via a cable or wirelessly to the control unit 30 and used there as input signal for regulating the SMA drivers 20.

The resistance measuring device 5 comprises a multiplexer 12 that is or can be connected to each one of the SMA elements 100 so that, especially due to the application of a measuring current by means of a power source 13, a resistance is measured in one of the SMA elements 100. Additionally, a signal amplifier 14 that can have an offset correction is expediently provided in the resistance measuring device 5. The measurement signal of the resistance that is received can now be evaluated in an evaluation unit 8. In the example shown, the evaluation unit is arranged in the resistance measuring device 5. Alternatively, it can be arranged as a separate component between resistance measuring device 5 and control unit 30.

The circuit arrangement shown in FIG. 2 can have a control unit 30 designed to activate the SMA elements 100-1 to 100-N by means of pulse width modulation.

Figure 3A:
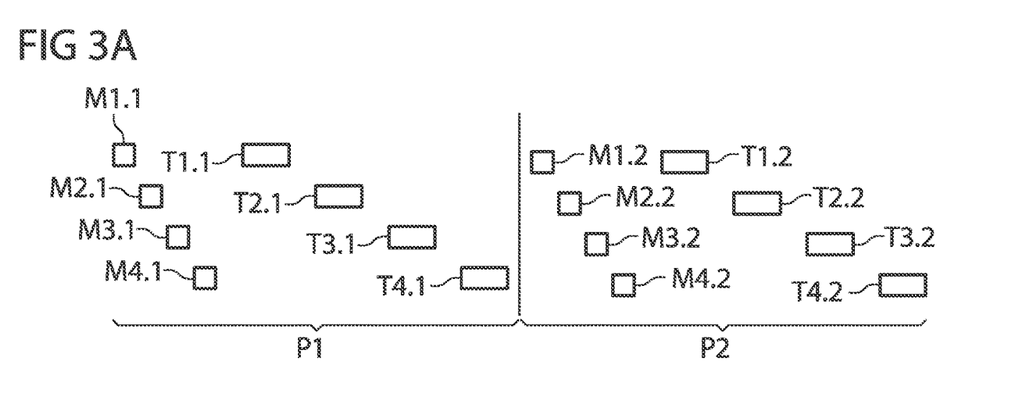
FIGS. 3a-3c are schematic views showing arrangements of measurement and control cycles according to the disclosure.

Here, the sequences shown in FIG. 3 between resistance measurement and energization or also variations thereof are especially possible. FIG. 3a shows two periods of a pulse width modulation in an example with four SMA elements 100-1 to 100-4. In the first period, the resistance measurements are initially performed in succession: M1.1 at the SMA element 100-1, M1.2 at the SMA element 100-2, M1.3 at the SMA element 100-3 and M1-4 at the SMA element 100-4. These measurements take place in a common dead time, as no SMA element is energized by means of a drive impulse T during these measurements. Subsequently, every one of the SMA elements 100-1 to 100-4 is preferably energized in the same order by means of the drive impulses T1.1 to T1.4. The first period P1, which lasts from a few μs to a few ms, ends after the last drive impulse T1.4. In the second period, the measurements M2.1, M2.2, M2.3 and M2.4, and afterwards the energizations T2.1, T2.2, T2.3 and T2.4, are performed in the same order. This sequence is performed until the final condition is reached in each SMA element. In case the final condition is reached prematurely in one SMA element, the sequence can also only be performed for the remaining SMA elements.

Figure 3B:
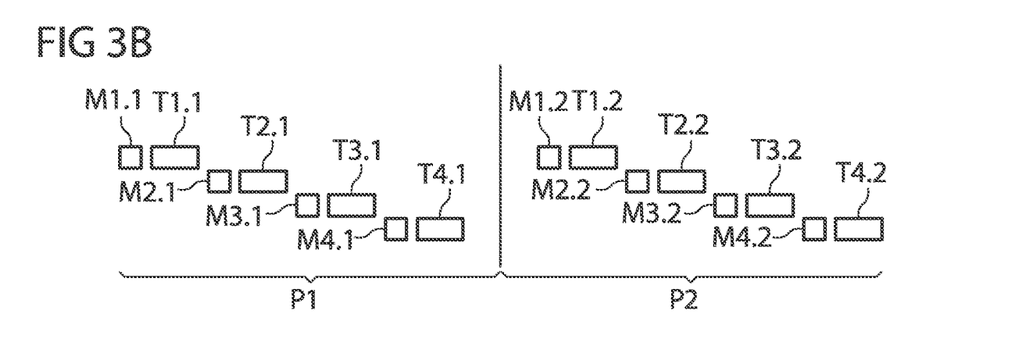

FIG. 3b shows an alternative sequence in which the measurement M1.1 is performed at first, followed by the energization of the SMA element 100-1 with the drive impulse T1.1. Only subsequently is this followed by the measurement M1.2 at the SMA element 100-2 and the energization with the drive impulse T1.2. This is performed until the SMA element 100-4 is measured and energized, so that all SMA elements were consecutively measured and energized in a period P1. Afterwards, the sequence is completely repeated in the period P2.

Figure 3C:
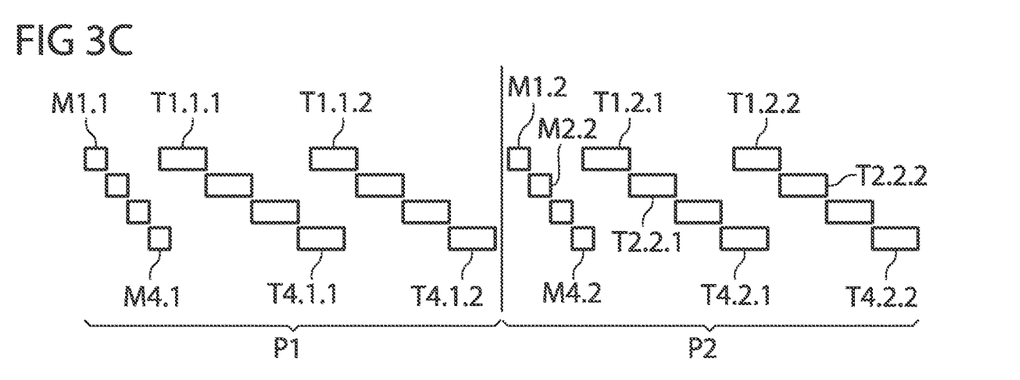

FIG. 3c shows another alternative sequence. This one corresponds initially to the sequence shown in FIG. 3a, but the drive impulses T1.1.2 to T4.1.2 follow the drive impulses T1.1.1 to T4.1.1 in a period.

Figure 4:
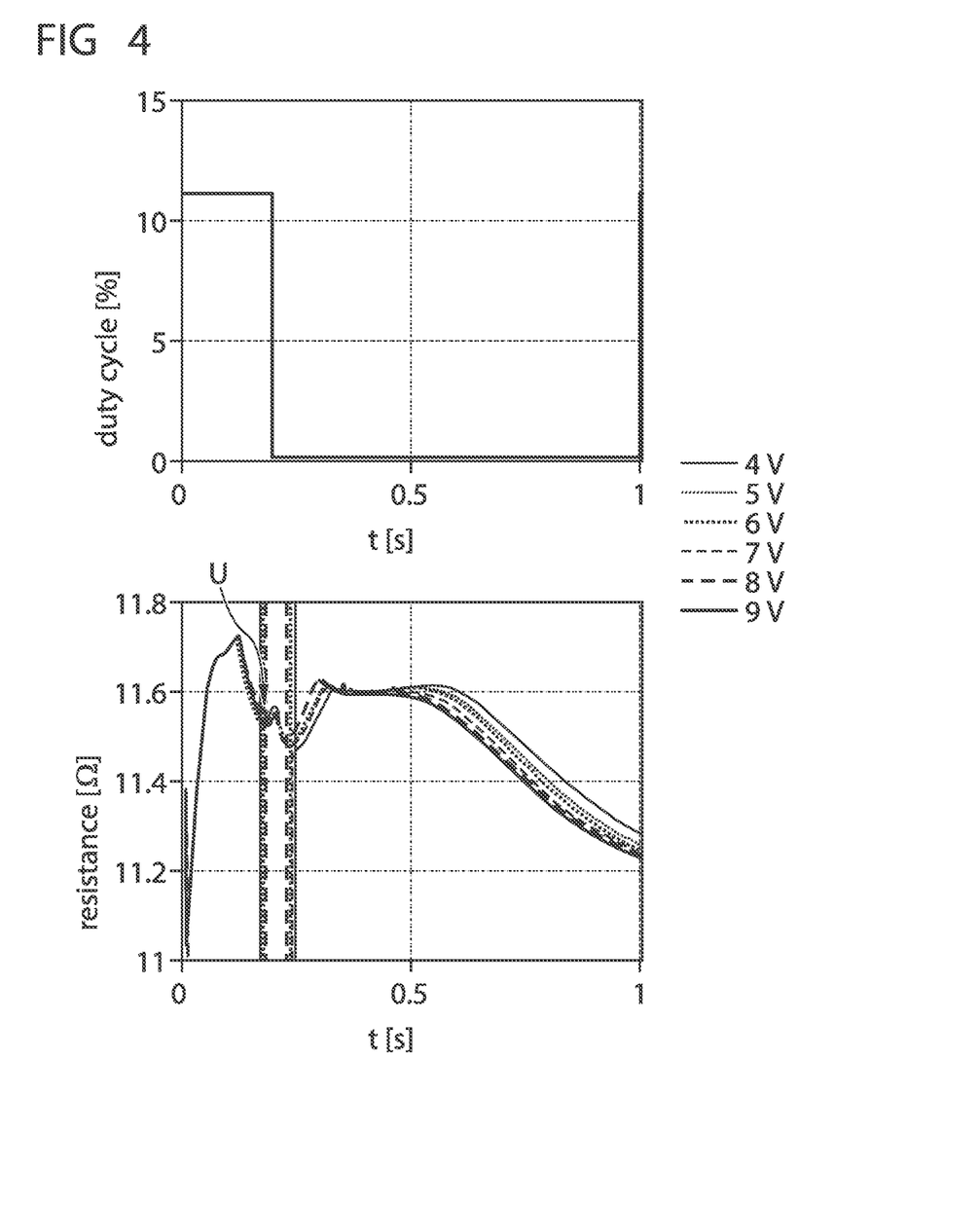
FIG. 4 is graphs showing a resistance curves over a duty cycle according to the disclosure.

FIG. 4 shows exemplarily a resistance curve of an SMA element. The resistance curve is plotted against time. After a current is applied to the SMA element with a voltage ranging from 4 to 9 V, the resistance increases at first and then decreases. When the endpoint is reached, a turning point U is marked in the resistance time curve. This turning point U can be recorded by evaluating the chronological sequence of the measured values. In practice, the energization in the pulse width modulation is not performed by a long drive impulse as shown in FIG. 4, but by many short drive impulses as shown in FIGS. 3a-3c. Here, in the range with the higher value of the duty cycle, which in the example a first frequency with short period duration lasting from few μs to few ms lies at 11%, and in the range with a low duty cycle lies a considerably lower frequency by a factor of 5 to 200, for example, can be used. In the second range, an actuator position can be especially maintained.

Figure 5:
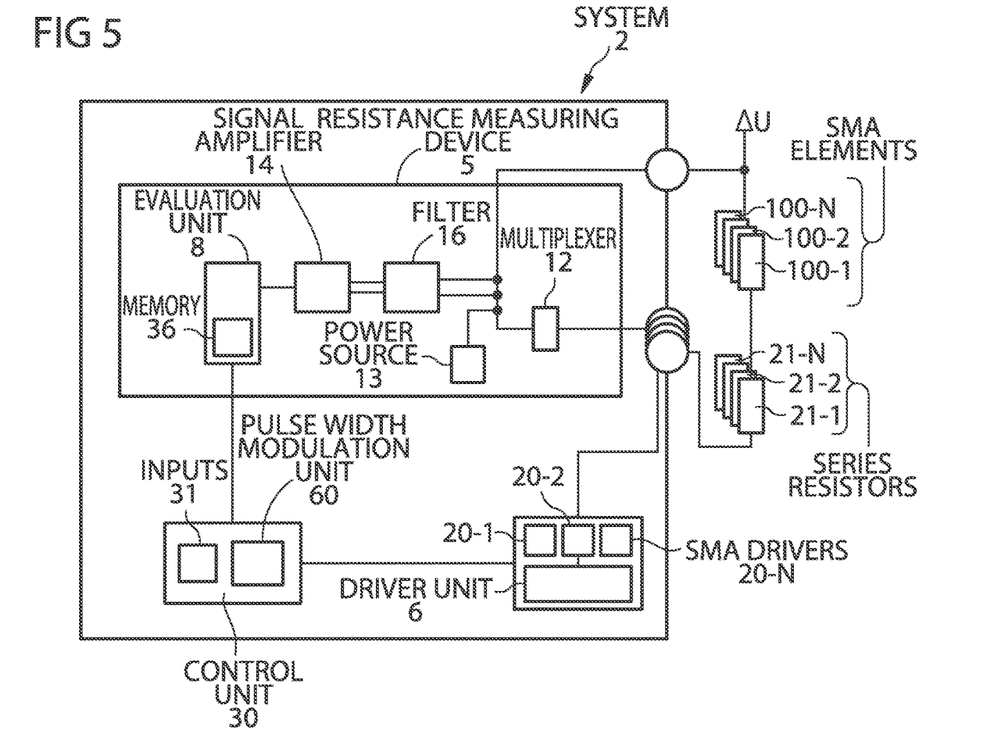
FIG. 5 is a schematic view of a second embodiment of a circuit arrangement according to the disclosure.

FIG. 5 shows a second embodiment of a circuit arrangement 1. The circuit arrangement 1 differs from the arrangement shown in FIG. 2 owing to the series resistors 21-1 to 21-N, which are in each case switched by the SMA elements 100-1 to 100-N. Furthermore, the arrangement differs in that a filter 16 is also arranged in the resistance measuring device 5 in addition to the amplifier 14. In principle, several filters and amplifier stages or integration elements, whose circuit for improving signals is known, can also be used in this case.

In the arrangement shown, the evaluation unit 8 includes a memory 36. However, an external memory that the evaluation unit 8 can access is just as possible.

Apart from the input 31 shown here, which can in principle also be present in the other arrangements, the control unit 30 can also include a pulse width modulation device that is connected to the driver unit 6 and hence to the drivers 20-1 to 20-N. Optionally, the control unit 30 can be designed for controlling the resistance measuring device 5.

Figure 6:
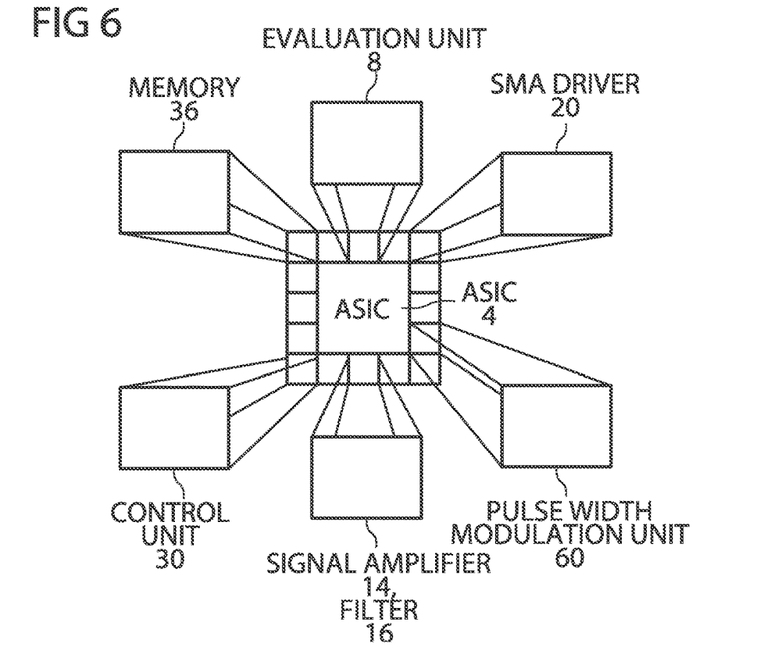
FIG. 6 is a schematic view of application-specific integrated circuit (ASIC) according to the disclosure.

FIG. 6 shows an ASIC. This ASIC 4 can have one driver 20, resistance measuring device 5, evaluation unit 8, memory 36, control unit 30, pulse width modulation unit 60, amplifier 14 or filter 16 or several of these components. Furthermore, if the ASIC includes the control unit 30, it can especially also include the inlet 31 for the input of a control signal, for example, which can be transmitted wirelessly or via cable.

LIST OF REFERENCE CHARACTERS

1 Circuit arrangement
2 System
4 ASIC
5 Resistance measuring device
6 Driver unit
8 Evaluation unit
12 Multiplexer
13 Power source
14 Signal amplifier
16 Filter
20 SMA driver
21 Series resistor
24 Resistance
30 Control unit
31 Input
36 Memory
38 Feedback device
40 Pump driver
50 Current sensor
60 Pulse width modulation unit
70 Temperature sensor
71 Voltage sensor
100 SMA element
101 Crimp
102 Valve housing
103 Actuator
104 Adjusting element
104a Through-hole
105 First opening
106 Second opening
107 End switch
108 Sealing element
109 Base plate
110 Circuit board
120 Valve
130 Air cushions
140 Pump
M1.1-Mn.n Resistance measurement
T1.1-Tn.n Drive impulse
U Voltage source

The invention claimed is:

1. A circuit arrangement for controlling a system for a seat comfort function, the circuit arrangement comprising:
   at least one actuator with at least one adjusting element and at least one SMA element, wherein the adjusting element can be moved from a first position to a second position;
   at least one resistance measuring device to measure a resistance of the at least one SMA element;
   at least one driver unit to activate the actuator with the at least one SMA element;
   a control unit to control the driver unit, the driver unit being configured for processing an output signal of the resistance measuring device; and
   the circuit arrangement being configured so that the resistance measuring device and the driver unit are alternatingly operationally connected to the SMA element.

2. The circuit arrangement according to claim 1, further including an evaluation unit, wherein the evaluation unit is connected between the resistance measuring device and the control unit.

3. The circuit arrangement according to claim 1, further including a plurality of actuators, wherein the resistance measuring device includes a multiplexer connected to all of the SMA elements so that the resistance of each SMA element can be individually measured.

4. The circuit arrangement according to claim 2, wherein the evaluation unit includes a memory, wherein the evaluation unit at least one of evaluates a history of the resistance measured in succession for one of the SMA elements and compares the resistance measured for one of the SMA elements with at least one specified resistance values.

5. The circuit arrangement according to claim 1, wherein the control unit is configured to control using pulse width modulation.

6. The circuit arrangement according to claim 1, wherein the evaluation unit includes at least one of a signal amplifier and a filter for noise suppression.

7. The circuit arrangement according to claim 1, wherein the resistance measuring device includes at least two multiplexers, each of the multiplexers connected to a portion of the SMA elements.

8. The circuit arrangement according to claim 1, wherein a series resistor is connected in series between the resistance measuring device and each SMA element.

9. The circuit arrangement according to claim 1, further including an application-specific integrated circuit having at least one of a driver, a resistance measuring device, an evaluation unit, a memory, and a control unit.

10. A method for controlling a circuit arrangement according to claim 1, comprising the steps of:
   measuring a resistance of an SMA element;
   after the measuring step, controlling the SMA element using a driver depending on one of the measured resistance value or a change in the resistance value; and
   cyclically repeating the measuring step and the controlling step until a final condition is reached.

11. The method according to claim 10, wherein the final condition includes reaching one of a specified resistance value, a specified change, or a turning point of a resistance value curve.

12. The method according to claim 10, wherein the controlling step is performed using pulse width modulation.

13. The method according to claim 10, wherein one of the measurement of the resistance of all SMA elements takes place in a common control dead time, or the measurement of an SMA element takes place in between the control of the SMA element and the control of the subsequent SMA element.

* * * * *